United States Patent
Nucci et al.

(10) Patent No.: US 9,710,282 B2
(45) Date of Patent: Jul. 18, 2017

(54) SYSTEM TO AUTOMATE DEVELOPMENT OF SYSTEM INTEGRATION APPLICATION PROGRAMS AND METHOD THEREFOR

(75) Inventors: Richard C. Nucci, Wynnewood, PA (US); James T. Ahlborn, Downington, PA (US); Mitchell Stewart, West Chester, PA (US)

(73) Assignee: DELL PRODUCTS, LP, Round Rock, TX (US)

( * ) Notice: Subject to any disclaimer, the term of this patent is extended or adjusted under 35 U.S.C. 154(b) by 951 days.

(21) Appl. No.: 13/333,517

(22) Filed: Dec. 21, 2011

(65) Prior Publication Data

US 2013/0167109 A1 Jun. 27, 2013

(51) Int. Cl.
*G06F 9/44* (2006.01)
*G06Q 10/06* (2012.01)
*G06Q 10/08* (2012.01)

(52) U.S. Cl.
CPC ............ *G06F 9/44* (2013.01); *G06Q 10/067* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 5,410,675 A | | 4/1995 | Shreve et al. |
| 5,727,154 A | * | 3/1998 | Fry et al. ...................... 709/248 |
| 5,754,306 A | * | 5/1998 | Taylor .................. G06Q 10/107 358/400 |
| 5,794,246 A | | 8/1998 | Sankaran et al. |
| 5,857,211 A | * | 1/1999 | Carper et al. ................. 715/236 |
| 5,917,730 A | | 6/1999 | Rittie et al. |
| 5,953,533 A | | 9/1999 | Fink et al. |
| 6,014,670 A | | 1/2000 | Zamanian et al. |
| 6,032,158 A | | 2/2000 | Mukhopadhyay et al. |
| 6,038,590 A | | 3/2000 | Gish |

(Continued)

FOREIGN PATENT DOCUMENTS

| WO | WO 02/102097 A1 | 12/2002 |
|---|---|---|
| WO | WO 03003158 A2 * | 1/2003 |
| WO | WO 2008/134627 A2 | 11/2008 |

OTHER PUBLICATIONS

"The Quest for a Cloud Integration Strategy," Boomi Whitepaper, 2011, http://marketing.boomi.com/QuestForCloudIntegration.html.

(Continued)

*Primary Examiner* — Chat Do
*Assistant Examiner* — Sergio J Curbelo, III
(74) *Attorney, Agent, or Firm* — Larson Newman, LLP

(57) ABSTRACT

A symbolic representation of a business process is received, the process including transfer of information from a first software application to a second software application. An association between a first data field included at the first software application and a second data field included at the second software application is determined, and a data manipulation operation to modify data associated with the first data field is determined, the modified data to be stored at the second data field. The determining is based on association information and data manipulation operations maintained at a database. The association information and the data manipulation operations are determined based on previously received business process representations.

16 Claims, 8 Drawing Sheets

(56) References Cited

U.S. PATENT DOCUMENTS

| | | | |
|---|---|---|---|
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |
| 6,626,957 B1 | 9/2003 | Lippert et al. | |
| 6,640,226 B1 | 10/2003 | Shringeri et al. | |
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,850,947 B1 | 2/2005 | Lim et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,922,831 B1 | 7/2005 | Kroening et al. | |
| 6,985,901 B1* | 1/2006 | Sachse et al. | |
| 6,988,165 B2 | 1/2006 | White et al. | |
| 6,993,743 B2 | 1/2006 | Crupi et al. | |
| 6,996,584 B2 | 2/2006 | White et al. | |
| 6,996,589 B1* | 2/2006 | Jayaram et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,379,938 B2* | 5/2008 | Charters | G06F 17/30569 |
| 7,406,474 B2* | 7/2008 | Musteata | G06F 9/54 |
| 7,496,888 B2 | 2/2009 | Sanjar et al. | |
| 7,499,951 B2 | 3/2009 | Mueller et al. | |
| 7,590,724 B1 | 9/2009 | Williams | |
| 7,610,575 B2 | 10/2009 | Sproule | |
| 7,792,784 B2 | 9/2010 | Gupta | |
| 7,836,103 B2* | 11/2010 | Li | G06F 17/30569 707/705 |
| 7,941,784 B2 | 5/2011 | Shenfield et al. | |
| 8,036,939 B2 | 10/2011 | Gil et al. | |
| 8,060,396 B1 | 11/2011 | Bessler et al. | |
| 8,095,416 B2 | 1/2012 | Harvey et al. | |
| 8,126,762 B2 | 2/2012 | Ramachandran et al. | |
| 8,165,993 B2 | 4/2012 | Broda et al. | |
| 8,271,615 B2 | 9/2012 | Ellison et al. | |
| 8,276,115 B2 | 9/2012 | Bates et al. | |
| 8,326,873 B2* | 12/2012 | Ellis et al. | 707/783 |
| 8,719,119 B1* | 5/2014 | Wargin et al. | 705/30 |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0091863 A1* | 7/2002 | Schug | 709/250 |
| 2002/0095650 A1 | 7/2002 | Green et al. | |
| 2002/0104067 A1 | 8/2002 | Green et al. | |
| 2002/0123993 A1* | 9/2002 | Chau et al. | 707/5 |
| 2003/0204637 A1* | 10/2003 | Chong | 709/310 |
| 2003/0221184 A1 | 11/2003 | Gunjal et al. | |
| 2003/0236677 A1 | 12/2003 | Casati et al. | |
| 2004/0015408 A1* | 1/2004 | Rauen et al. | 705/26 |
| 2004/0068431 A1 | 4/2004 | Smith et al. | |
| 2004/0068550 A1* | 4/2004 | Giannetti | G06F 17/30905 709/215 |
| 2004/0083284 A1* | 4/2004 | Ofek et al. | 709/224 |
| 2004/0133876 A1 | 7/2004 | Sproule | |
| 2004/0186860 A1* | 9/2004 | Lee et al. | 707/200 |
| 2004/0243921 A1* | 12/2004 | Carr | G06F 17/30014 715/208 |
| 2005/0005262 A1 | 1/2005 | Mohan et al. | |
| 2005/0049996 A1* | 3/2005 | Srinivasan et al. | 707/1 |
| 2005/0198618 A1 | 9/2005 | Lalonde et al. | |
| 2005/0273758 A1 | 12/2005 | Long | |
| 2006/0149794 A1* | 7/2006 | Ylinen | 707/203 |
| 2006/0161495 A1 | 7/2006 | Wigzell | |
| 2006/0184933 A1 | 8/2006 | Chessell et al. | |
| 2006/0235882 A1* | 10/2006 | Mateescu et al. | 707/104.1 |
| 2007/0168206 A1 | 7/2007 | McCall et al. | |
| 2007/0282851 A1* | 12/2007 | Wingfield et al. | 707/10 |
| 2008/0163164 A1 | 7/2008 | Chowdhary et al. | |
| 2008/0177718 A1* | 7/2008 | Hasson et al. | 707/4 |
| 2008/0196006 A1 | 8/2008 | Bates et al. | |
| 2008/0209078 A1 | 8/2008 | Bates et al. | |
| 2008/0209260 A1* | 8/2008 | Vykunta | 714/6 |
| 2008/0270977 A1 | 10/2008 | Nucci et al. | |
| 2009/0112666 A1 | 4/2009 | Guo et al. | |
| 2009/0138790 A1* | 5/2009 | Larcheveque et al. | 715/224 |
| 2009/0172581 A1* | 7/2009 | Burling et al. | 715/770 |
| 2010/0023362 A1 | 1/2010 | Nguyen et al. | |
| 2010/0070981 A1 | 3/2010 | Hadar | |
| 2010/0306709 A1 | 12/2010 | Lynch et al. | |
| 2011/0282715 A1 | 11/2011 | Nguyen et al. | |
| 2012/0041945 A1 | 2/2012 | Blubaugh | |
| 2012/0059840 A1* | 3/2012 | Reddy | G06F 17/303 707/763 |

OTHER PUBLICATIONS

Boomi Integration Platform datasheet Boomi, Inc., 2006.
Boomi On Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to Its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol, 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research The Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.

* cited by examiner

SYSTEM TO AUTOMATE DEVELOPMENT OF SYSTEM INTEGRATION APPLICATION PROGRAMS AND METHOD THEREFOR

CROSS REFERENCE TO RELATED APPLICATIONS

Related subject matter is contained in co-pending U.S. patent application Ser. No. 12/110,607, entitled "System and Method For Automated On-Demand Creation of a Customized Software Application," filed on Apr. 28, 2008, the disclosure of which is hereby incorporated by reference.

FIELD OF THE DISCLOSURE

This disclosure relates generally to information handling systems, and relates more particularly to automating development of system integration application programs.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
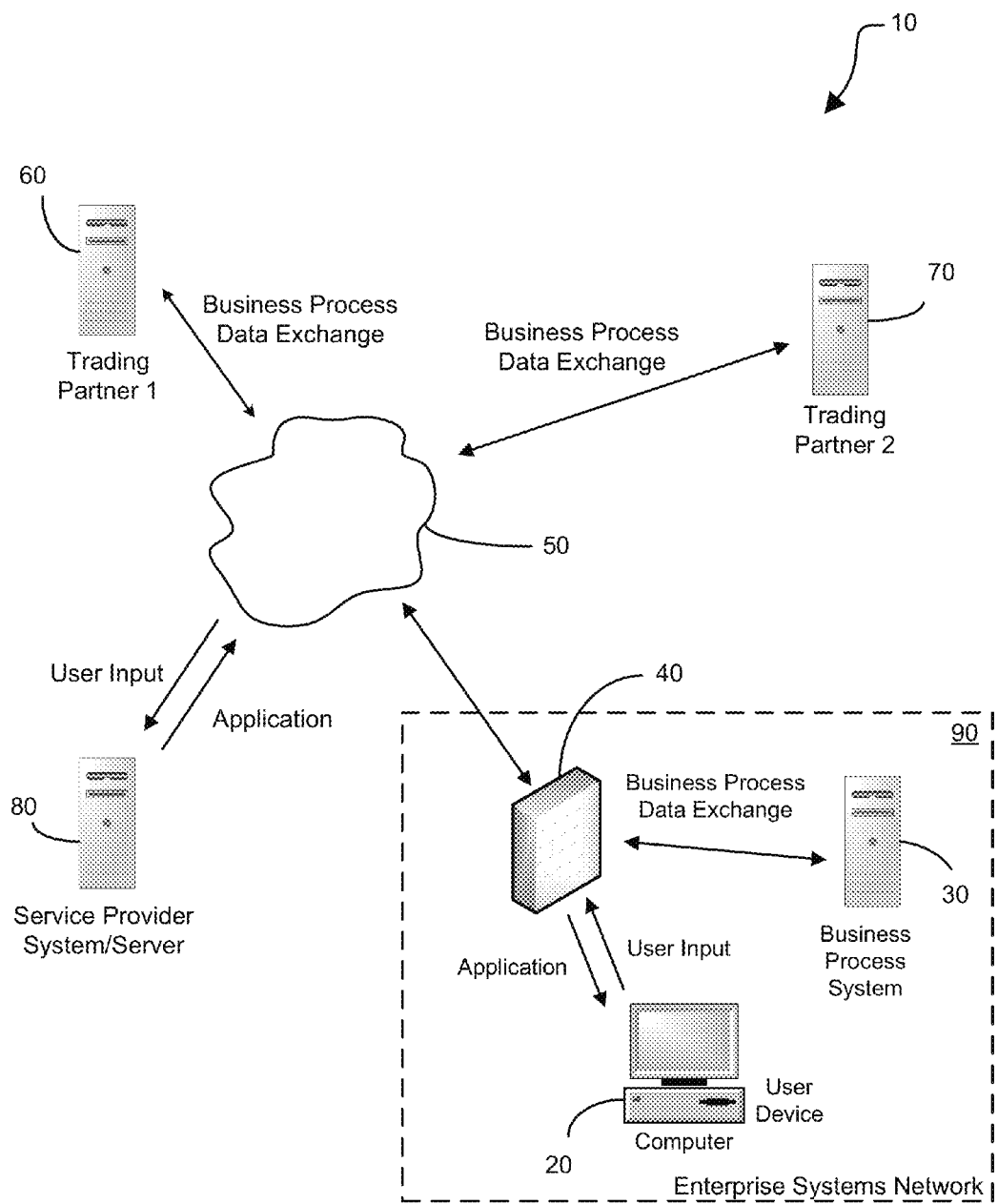
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client/server architectures, or middleware server architectures and associated components.

Today, most businesses and other enterprises have sophisticated computing systems that are used for facilitating internal operations and for communicating outside the enterprise's network, for example, to exchange information with business partners. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as business process integration. In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system and a seller's invoicing system.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. Such software applications are readily available in the market today. These applications are typically purchased from software vendors and installed on a computerized system owned and maintained by the business, in this example the buyer. The seller will have a similar/complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users/systems identical, generic form. The software application is then installed within a specific enterprise's computing network, which may include data centers, etc. physically located outside the physical boundaries of the enterprises. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

FIGS. 1-7 illustrate a system and method for automating development of customized system integration application programs. A web-based graphical interface is used to visually model a business process via a flowcharting process. During this modeling process the user selects from a predetermined set of process-representing visual elements that are stored on a remote server, such as the web server. For example, an enterprise can define an integration system to enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer such as Wal-Mart, transform the PO into a format recognizable by a certain internal order management software application of the enterprise, and then insert the contents of that PO directly into the enterprise's order management system.

The automated development system generates custom software to provide the desired interoperability as defined by the integration flowchart. The custom software may be packaged within a container program, also referred to herein as a dynamic runtime engine. The dynamic runtime engine may be an executable software application capable of running on a computer within the enterprise's network, which may include, for example, networks owned and/or operated by third party data center providers, such as OpSource, Amazon, etc. When started by a user, the executable software application connects to the automated development system and downloads an Extensible Markup Language (XML) representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a desktop PC, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JD Edwards ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes of a type well known in the art.

The system and methods disclosed herein allow an enterprise to obtain the capabilities needed to conduct the electronic exchange of data with one or more trading partners, internal applications, or applications available via the Internet, commonly referred to as Software as a Service. The present disclosure provides these capabilities in a unique fashion by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a provider of a service (service provider) for creating on-demand, real-time creation of customized software applications operates a service provider server/system 80 within the network 10. The system 80 may be specially configured in accordance with the present disclosure, and may be capable of communicating with devices in the enterprise's network 90. It should be noted that the communication between system 80 and network 90 is essentially unidirectional in that communications/communication sessions originate from network 90 to system 80, and not from system 80 to network 90. Accordingly, the network 90 need not have its firewall 40 modified to allow incoming traffic from communications sessions originating from system 80.

The automated development system may be configured in accordance with the present disclosure to provide web server functionality for presenting a user-accessible website. Communications between the user device 20 and the system 80 website may be performed using conventional communications technologies, such as the HTTPS protocol. The website may be specially configured to provide a graphical user interface providing a visual designer environment permitting a user to define process flows between applications/systems, such as between trading partner and enterprise systems, to model a customized business integration process. The graphical user interface may be used by different enterprises/customers of the service provider. The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 80.

The graphical user interface allows the user to provide user input providing information relating to trading partners, activities, enterprise applications, enterprise system attributes, and/or process attributes that are unique to the end-to-end business integration process of a specific enterprise. For example, the graphical user interface may provide drop down or other user-selectable menu options for identifying trading partners, application connector and process attributes/parameters/settings, etc., and dialog boxes permitting textual entries by the user, such as to describe the format and layout of a particular data set to be sent or received, for example a Purchase Order.

Figure 2:
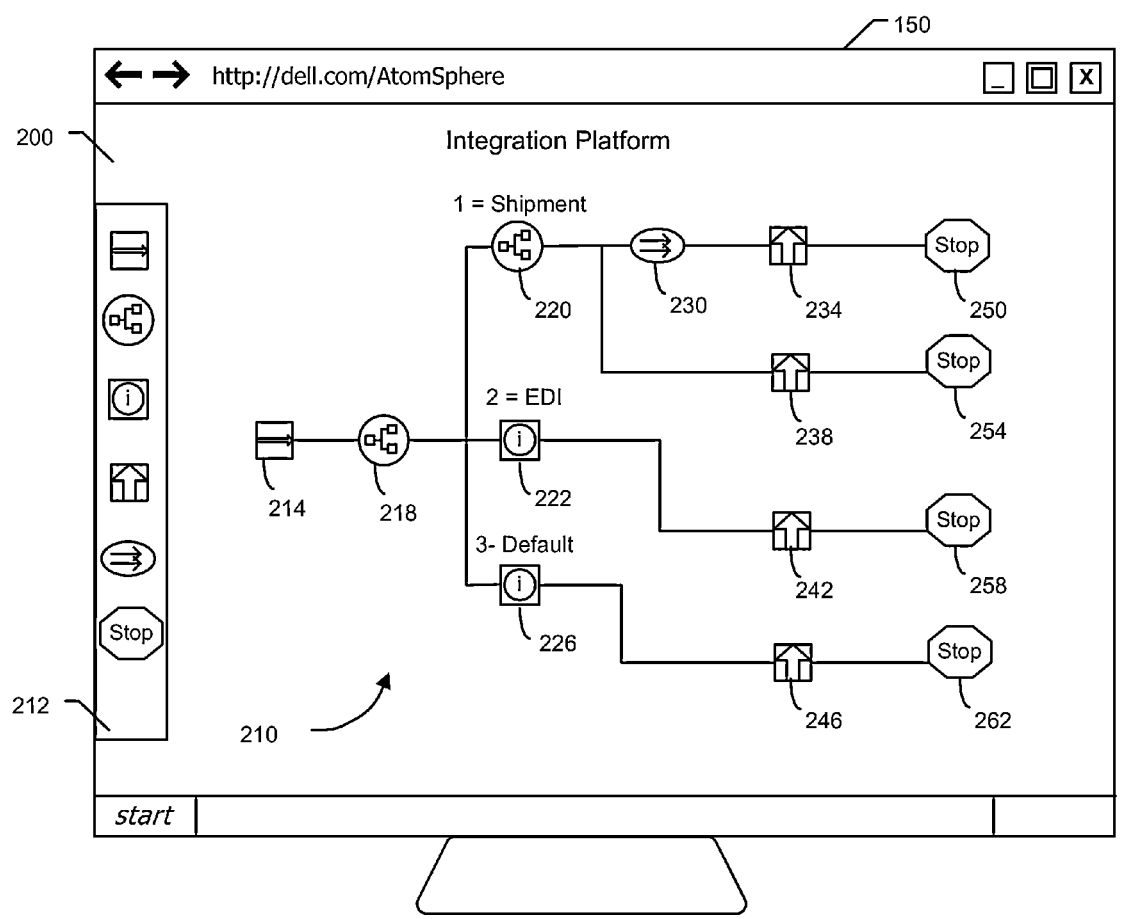
FIG. 2 illustrates a graphical user interface of a method for developing a system integration application program according to an embodiment of the present disclosure.

By way of illustrative example, the website interface may provide a visual menu of elements in a drag-and-drop environment permitting the user to create a visual model of business process activities desired to be handled by the customized software application. For example, this may involve a user's identification of receipt of purchase orders as an activity, or of issuance of invoices as an activity. By way of illustrative example, FIG. 2 shows a graphical user interface 200 of an integration platform displayed within a web browser window 150. The exemplary graphical user interface 200 displays an exemplary business process integration model 210 in the form of a flow diagram modeling a shipment order business process. The visual model may be created by a user within the visual designer environment, via the website interface provided by the system 80.

The exemplary flow diagram of FIG. 2 includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Various ones of these elements are selected from a menu 212 of elements and arranged by the user relative to one another as appropriate to model a corresponding business process. The elements may require data input from a user. For example, the inbound connector element 214 selected from the menu by the user may be configured by the user for a specific enterprise and process by the user's selection of the element and completing dialog boxes, selecting menu items, etc. as appropriate. For example, the user may provide as input for configuring data entry element 214 that the data will be inbound from an SAP system. This may be performed via a data entry field displayed in the window upon selection of data entry element 214. The element, in combination with any required data input, may be associated with a specific Connector code set stored in the memory of the system 80. The outbound connector elements may be similarly configurable. For example, the last step of the integration process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. This conversion, and the need for it, is transparent to the user configuring the integration process.

By way of further example, the routing element may require input for routing logic to be applied; the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others.

Documents that are read into or sent out of a business process, such as the business process of FIG. 2, are each associated with a data profile. The data profile describes the layout or format of respective documents. For example, a data profile associated with a document may include field names, delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

Figure 3:
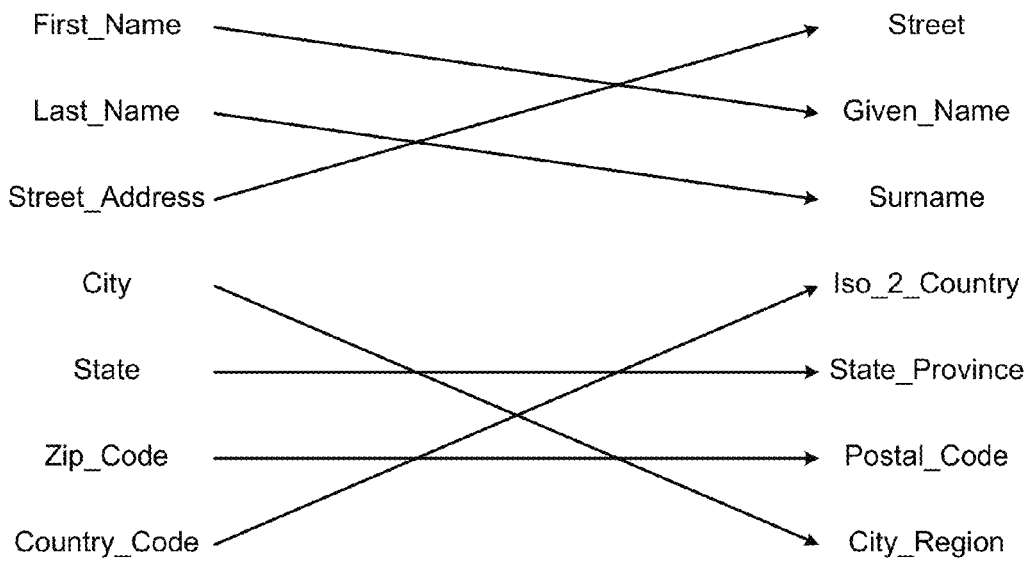
FIG. 3 is a block diagram illustrating a data map according to an embodiment of the present disclosure.

FIG. 3 shows a data map 300 according to an embodiment of the present disclosure. The data map 300 includes data fields 310 included at a first software application, labeled Application A, and data fields 320 included at a second software application, labeled Application B. Each data field represents a variable that can be associated with a value. For example, the data fields 310 include variables First_Name, Last_Name, Stree_Address, City, State, Zip_Code, and Country_Code. The data fields 320 include Street, Given_Name, Surname, Iso_2_Country, State_Province, Postal_Code, and City_Region. In an embodiment, a user of the business process integration platform graphical user interface 200 can manually generate a data map.

In an embodiment of the present disclosure, a user may drag and drop individual fields associated with a source data profile to a corresponding field of a destination data profile, as indicated by the arrows of FIG. 3. For example, the variable First_Name of Application A has been mapped to the variable Given_Name of Application B. The service provider 80 of FIG. 1 may use the data map 300 to generate and configure a system integration application program that will implement a customer's business process, such as the business process integration model 210 of FIG. 2. In another embodiment, the generation of a data map may be partially or fully automated based on information stored at a map database.

Figure 4:
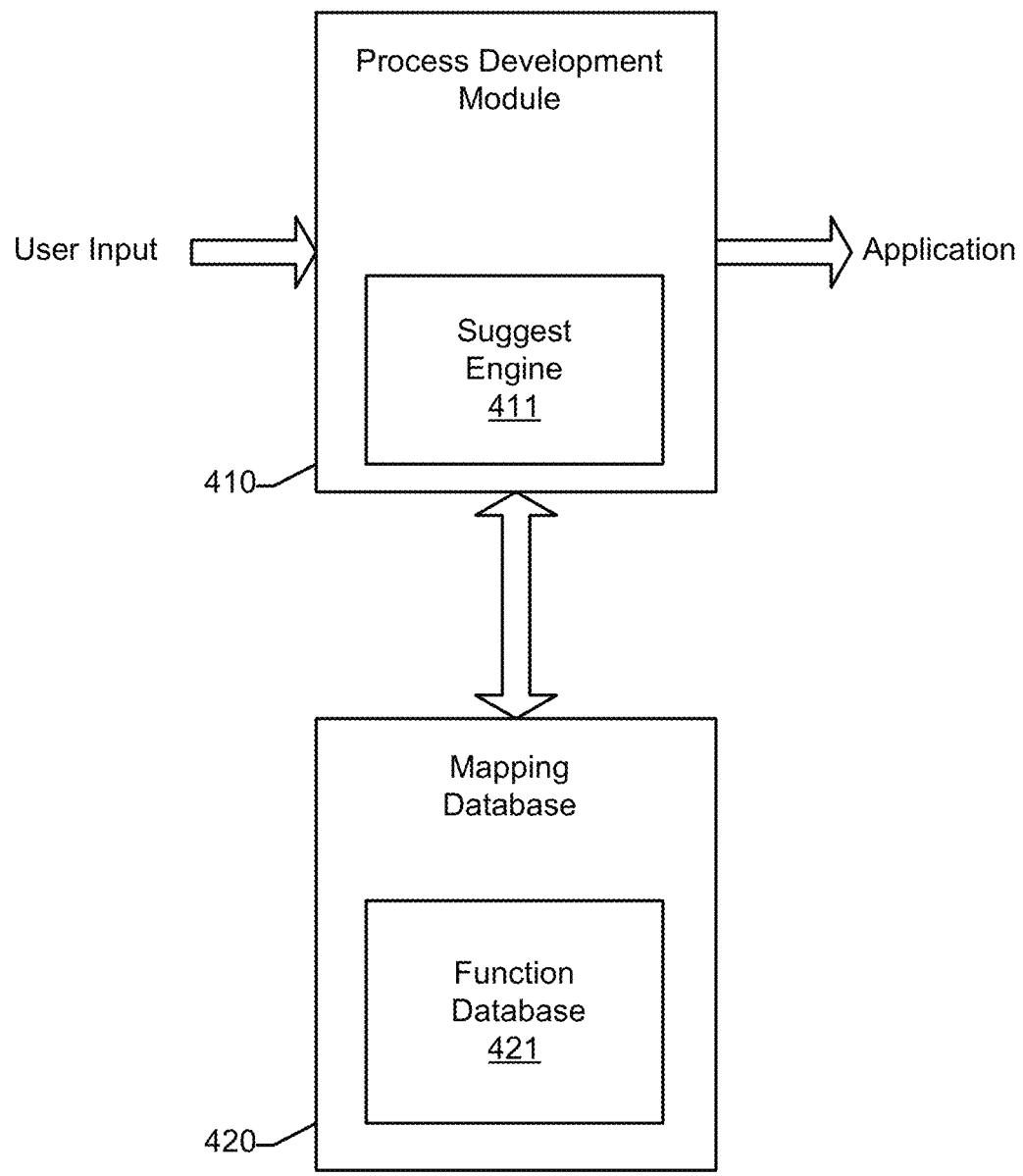
FIG. 4 is a block diagram illustrating a data map automation system according to an embodiment of the present disclosure.

FIG. 4 shows a data map automation system 400 in accordance with a specific embodiment of the present disclosure. The system 400 includes a process development module 410 and a mapping database 420. In other embodiments, the process development module 410 may include a suggest engine 411 and the mapping database 420 may include a function database 421. The process development module 410 may be implemented at the service provider 80 of FIG. 1, and may include hardware, software, or a combination thereof. The process development module may provide the graphical user interface 200 of FIG. 2, through which a user may symbolically describe a desired business model. The module 410 may be further operable to generate a plurality of code sets to render the specified system integration features as previously described with reference to FIG. 2.

The suggest engine 411 may be configured to provide data mapping suggestions based on a history of previously encountered mappings. For example, a user may instantiate a data mapping element at the interface 200 to specify associations between data fields included in one application to data fields of another application, such as described with reference to FIG. 3. In an embodiment, a record of this mapping, referred to as an index, may be stored at the mapping database 420. Additional data maps and individual associations provided by other, subsequent, users may also be stored at the mapping database 420. Over time, the mapping database 420 may grow to include a large number of mappings corresponding to a large number of source and destination application interfaces. In one embodiment, mapping information can be stored at the mapping database 420 in the context of a corresponding application. In another embodiment; individual associations are stored at the mapping database 420 without including a record indicating the identity of the corresponding applications. For example, the mapping database can include a collection of individual associations, also referred to as indexes, which identify a relationship between one variable name and another variable name.

In an embodiment, the process development module 410, and the suggest engine in particular, may query the mapping database 420 to determine if the map database includes mapping information (indexes) suitable for implementing a system integration process presently under development. In the event that the mapping database 420 includes suitable mapping information, the suggest engine 411 may either generate a code set to implement a complete data map based on the stored information, or the suggest engine 411 may provide recommendations of specific map associations to a user of the integration development platform based on the stored information. In the event that the mapping database 420 include multiple, but different, mapping associations for a particular destination variable, the suggest engine 411 can select a preferred association to a particular source variable. Alternatively, the suggest engine 411 can provide a prioritized list of association suggestions to the user based on various selection and ranking criteria. For example, a preferred mapping association may be selected based on the number of times a particular association has been identified in previously encountered system integration process models. For another example, a list of mapping suggestions can be prioritized based on a degree to which names of variables match the names of variables included at the mapping database 420. Thus, mapping suggestions can be presented to a user based on a level of confidence that the suggest engine 411 associates with each of a set of indexes. The operation of the suggest engine 411 is described in further detail below with reference to FIG. 7.

Mapping information stored at the mapping database 420 may include map function information. A map function allows data to be modified as it moves from source element(s) to destination element(s). A map function specifies a data manipulation operation that is to be performed on the value of variables as the variables are transferred from one application to another. Map functions can include string manipulations, numerical manipulations, combining the values of two or more source fields to be stored at a single destination field, splitting the value of a source variable and storing respective portions of the value at two or more destination fields, and the like. Map functions can include simple data manipulations such as string truncation, or can be complex. For example, a map function can be represented by a software program such as a Java script. In an embodiment, a map function can get or set document properties, or process properties, associated with one or more applications. For example, a map function can initiate access of information from a database, such as an SQL database, get a current date, and the like. Variables defined by map functions can be accessed by other map functions. Map function information can be stored at the function database 421 and can be associated with corresponding data maps or can be associated with individual mapping associations.

Figure 5:
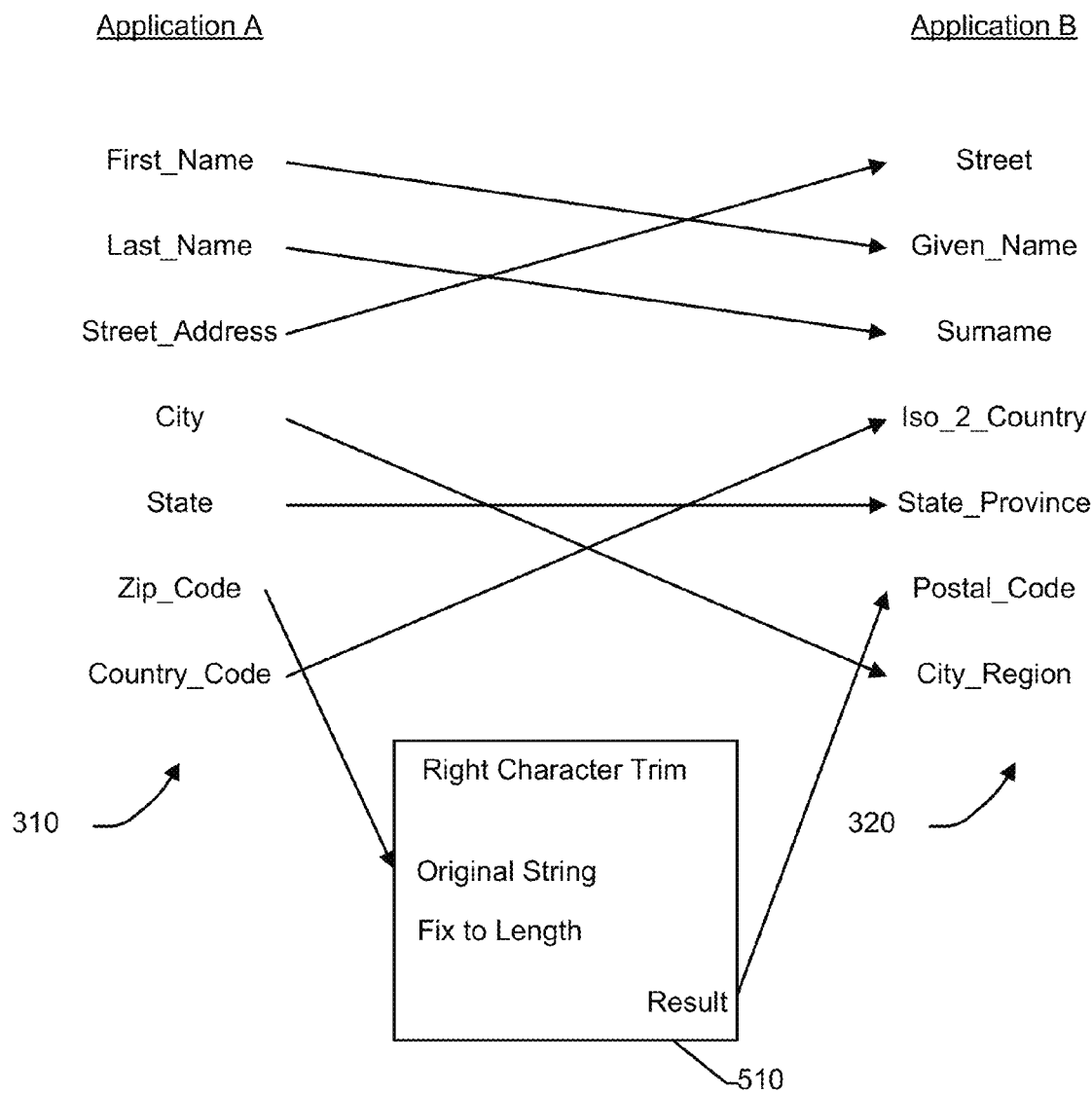
FIG. 5 is a diagram illustrating a data map including a map function according to an embodiment of the present disclosure.

FIG. 5 shows a data map 500 including a map function according to an embodiment of the present disclosure. The data map 500 is similar to the data map 300 of FIG. 3, but includes a single map function 510. The map function 510 specifies a truncation operation to be performed on the value of the variable Zip_Code when the value is transferred from application A to application B. For example, the Zip_Code field of application A may be defined to include an eleven character value, such as 78735-0356, while the field Postal_Code filed of application B is limited to a traditional five character value. Accordingly, the map function 510 is configured to perform a Right Character Trim operation, providing the value 78735 to application B.

Map functions allow conversion logic to be applied to individual values as they are being mapped. For example, the user may want to convert a character to uppercase, change the format of a date, or look up a value in a database. There are two main types of functions: Standard functions and User defined functions. Standard functions perform a single step, such as converting a value to uppercase. For example, converting a value to uppercase; and User Defined functions enable sophisticated transformations by allowing the user to link multiple standard functions steps together. They are saved as standalone components and reused. Map Functions allow conversion logic to be applied to individual values as they are being mapped. For example, the user may want to convert a character to uppercase, change the format of a date, or look up a value in a database.

Functions can include string functions, numeric functions, date functions, lookup functions, custom scripting functions, connector functions, properties functions, and the like. The Right Character Trim function described above with reference to FIG. 5 is an example of a string function. An example of a numeric function is a Math Ceiling function, which rounds the value of an input variable up to the nearest whole number, for example 1.2→2.0. An example of a date function is a Date Format function, which reformats a date value associated with a source element into a format compatible with a destination element. For example, a variable associated with a date at a source document may utilize a date format YYYYMMDD while a corresponding variable at a destination document may instead have a format MMDDYYYY or MMDDYY. The Date Format function modifies the value of a date variable as it passes from a source application to a destination application.

An example of a lookup function is a SQL Lookup, which executes a static or dynamic select-query against a database. This function is typically used to perform cross reference lookups or obtain supplemental data. A custom scripting function can be configured to perform complex manipulations using JavaScript, Groovy syntax, or another programming language or scripting language. An example of a connector function is a Connector Call function, which perform a call out to any application connector. Like the lookup function, the Connector Call function is typically used to perform cross reference lookups or obtain supplemental data. Property functions include Set Process Property, Get Process Property, and the like, which are used to set and retrieve, respectively, the value of a process property. Process properties are name/value pairs or variables that can be used to store arbitrary information to assist with the process development module 410 with generating an integration code set. The properties have execution scope, meaning once set they remain available for the duration of the current process execution. This also means the properties are available across other processes initiated via a Process Call step, as is common in parent/child process designs.

User defined map functions allow multiple standard functions to be linked together. For example, a user could configure a process to get the current date in one step, and change the format in a second step. Once created, the user defined map function can be reused just like standard functions. A custom scripting map function allows a user to specify sophisticated field level transformations as well as implement conditional (if/else) field mapping. Custom scripting map function steps can be added directly to a map or used within a user defined function. The suggest engine 411 can be configured to provide standard or user defined map function recommendations based on a desired level of assistance and based on the applicability of functions stored at the function database 421.

Figure 6:
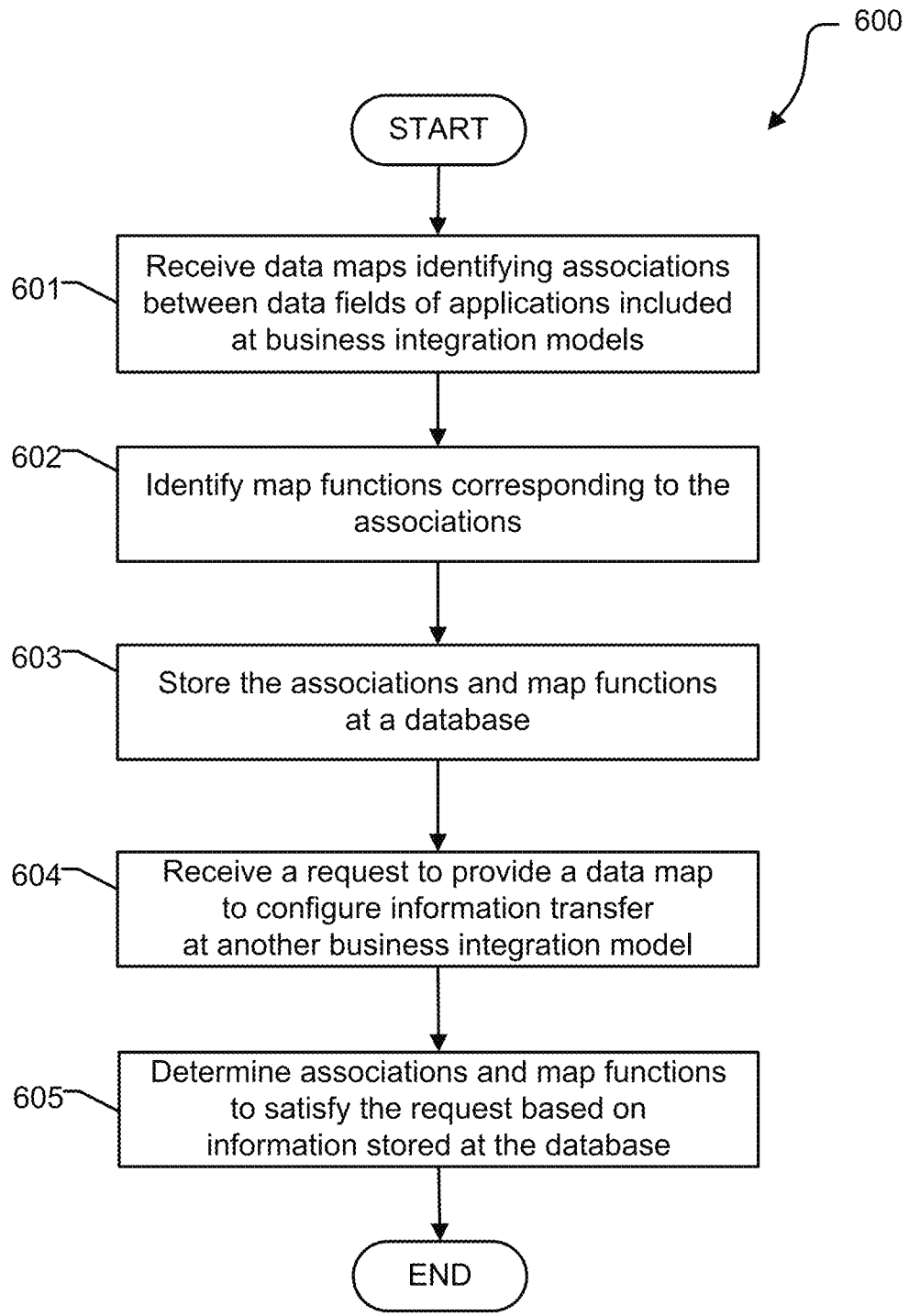
FIG. 6 is a flow diagram illustrating a method according to an embodiment of the present disclosure.

FIG. 6 shows a method 600 in accordance with an embodiment of the present disclosure. The method 600 shows how a database containing data map associations and map functions can be queried to provide mapping solutions or suggestions for a new business integration process model that is being developed. The flow begins at block 601 where data maps identifying associations between data fields of applications included at a plurality of business integration models are received. For example, a user can generate a symbolic representation of a business process using the graphical user interface 200 provided by a service provider 80. The business process can include a data map specifying how information included at one application can be mapped to another application. The flow proceeds to block 602 where map functions corresponding to the associations are identified. The flow proceeds to block 603 where the associations and corresponding map functions are stored at a database, such as the mapping database 420 of FIG. 4. The flow proceeds to block 604 where a request to provide a data map to configure information transfer at another business integration model is received. For example, another user of the integration platform at the service provider 80 may provide a process model that includes the need to transfer information from one application to another. The user may request assistance in generating a data map and associated map functions to implement the data transfer. The flow proceeds to block 605 where associations and map functions that satisfy the request are determined based on mapping information stored at the database. For example, the suggest engine 411 of FIG. 4 can identify associations and map functions included at the mapping database 420 and function database 421 that best match the needs of the business integration system presently under development, and present suggestions of how best to implement the application interface based on based on the stored information.

Figure 7:
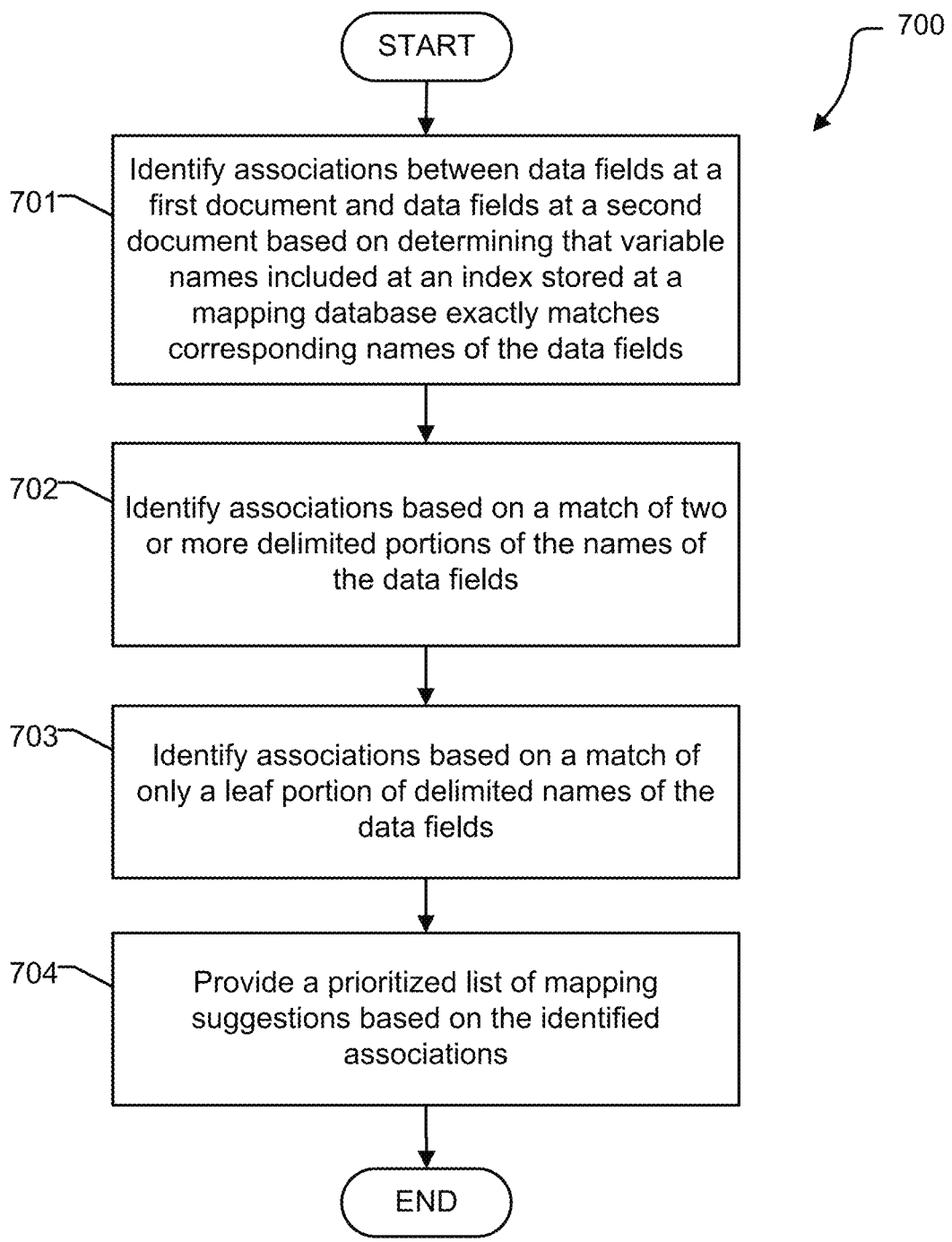
FIG. 7 is a flow diagram illustrating another method according to an embodiment of the present disclosure.

FIG. 7 shows a method 700 in accordance with an embodiment of the present disclosure. The method 700 can be implemented by the suggest engine 411 of FIG. 4. Data fields and other variables included at database applications often include information formatted to conform to the XML protocol, wherein the names of data fields may include a string providing hierarchical or path information. The suggest engine 411 is configured to recommend mapping associations between source and destination applications based on indexes included at the mapping database 420, where the indexes represent associations previously implemented by other users of the process development module 410.

The method 700 begins at block 701 where associations between data fields at a first document and data fields at a second document are identified based on determining that variable names specified by an index stored at a mapping database exactly matches corresponding names of data fields included at a destination application. For example, if a system integration process model specifies the transfer of information between two applications and the destination application includes a data field (variable) named Customer_Telephone_Number, and the mapping database 420 also includes an index having a destination data field named Customer_Telephone_Number, the suggest engine can determine if the source data field specified by the identified index fully matches a data field at the source application. If the identified index exactly matches corresponding data fields at the source and destination applications, the suggest engine 411 can propose the mapping specified by this index with a relatively high level of confidence. Such an association is referred to as a full-path match. If the mapping database includes other indexes that specify alternative mappings, the suggest engine 411 can provide a prioritized list of mapping suggestions, the priority assigned to each of the proposed mappings based on predetermined ranking criteria. For example, mapping suggestions can be ranked based on how frequently respective mappings have been implemented by other users of the process development module 410.

The method 700 proceeds to block 702 where associations can be identified based on a match of two or more delimited portions of the names of the data fields. For example, data fields included at a destination application may be named Shipping_Company_Address_State and Billing_Contact_Address_State. The suggest engine 411 can determine that the strings Company_Address_State and Contact_Address_State represent the shortest unique portions of these variable names, because including any fewer portions of the data field would render names strings that are no longer unique. For example, if only the last two portions of these data fields are selected, the resulting string, Address_State, matches more than one destination data field and therefore is ambiguous. Field names at the source application can be similarly analyzed to identify a set of shortest unique source strings. The suggestion engine 411 can query the mapping database 420 to determine whether the database includes indexes having a destination string that matches one or more of the shortest unique destination strings. If a match is found at the mapping database 420, the suggest engine 411 can further identify whether any shortest unique strings associated with the source application match the value of the source string of the identified index. If a match is identified, the suggest engine 411 can recommend that the corresponding source and destination data fields (the full profile names) be associated with one another. In addition, the suggest engine 411 can provide a list of proposed mapping suggestions that is prioritized based on the degree to which delimited portions of variable fields match an index included at the mapping database 420 (the more portions that match, the greater the confidence that the association is correct). Prioritization can also be based on the number of times a particular association has been identified by prior users of the system.

The method 700 proceeds to block 703 where the suggest engine 411, having failed to identify associations based on a match of the full name or based on a match of a shortest unique string, can recommend associations based on a match of only a leaf portion of the delimited names of the data fields. For example, if a destination application includes a data field having the name Customer_Name, the string Name is referred to as the leaf portion of the data field name. Therefore, in lieu of identifying associations having a greater level of confidence, the suggest engine 411 can propose an association between data fields of a source application and data fields of a destination application based on determining that the mapping database includes an index providing an association between a pair of leaf names. However, such an association should not be suggested if the leaf name is not unique. For example, if the destination application also includes a variable Order Name, no association is provided if there is no further basis by which to resolve ambiguity, because two data fields include the leaf string, Name. The flow proceeds to block 704 where a prioritized list of mapping suggestions is provided to a user of the process development module 410 based on the associations identified at blocks 701-703.

Figure 8:
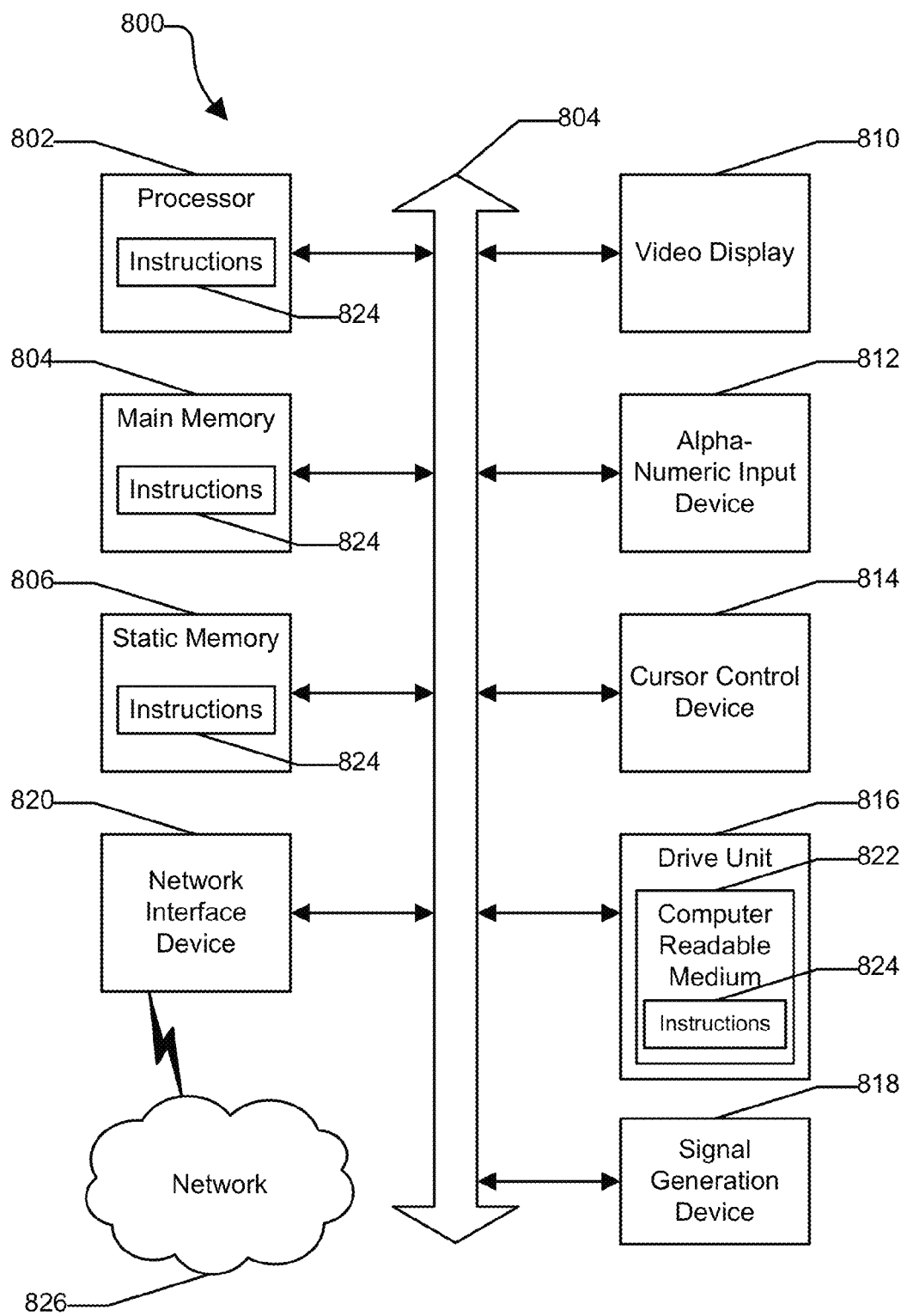
FIG. 8 illustrates a block diagram of an information handling system according to and embodiment of the present disclosure.

FIG. 8 shows an information handling system 800 capable of administering each of the specific embodiments of the present disclosure. The information handling system 800 can represent the user device 20, the systems 30, 60, 70, and 80 of FIG. 1, the automation system 400 of FIG. 4, or another data processing device associated with the business network system 10. The information handling system 800 may include a processor 802 such as a central processing unit (CPU), a graphics processing unit (GPU), or both. Moreover, the information handling system 800 can include a main memory 804 and a static memory 806 that can communicate with each other via a bus 808. As shown, the information handling system 800 may further include a video display unit 810, such as a liquid crystal display (LCD), an organic light emitting diode (OLED), a flat panel display, a solid state display, or a cathode ray tube (CRT). Additionally, the information handling system 800 may include an input device 812, such as a keyboard, and a cursor control device 814, such as a mouse. The information handling system 800 can also include a disk drive unit 816, a signal generation device 818, such as a speaker or remote control, and a network interface device 820. The information handling system 800 can represent a server device whose resources can be shared by multiple client devices, or it can represent an individual client device, such as a desktop personal computer.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 1000 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The disk drive unit 816 may include a computer-readable medium 822 in which one or more sets of instructions 824 such as software can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving at a service provider first mapping information at a first time, the first mapping information identifying a correspondence between a first variable included at a first document providing access to information associated with a first software application program and a second variable included at a second document associated with a second software application, the first document and the second document provided by a first customer of the service provider and included at a first system integration application program providing an interface for communicating information between the first software application and the second software application;
   identifying a first data manipulation operation, the operation to generate a value of the second variable based on a value of the first variable;
   storing the first mapping information and the first data manipulation operation at a database;
   receiving a request from a second customer of the service provider at a second time, the request to identify a correspondence between variables included at a third document and variables included at a fourth document, the third document and the fourth document provided by the second customer;
   determining, by the service provider using a computer, a correspondence between a third variable included at the third document and a fourth variable included at the fourth document based on the first mapping information and based on the first data manipulation operation;
   and providing, by the service provider, a second system integration application program based on the determining, the system integration application program to provide an interface for communicating information between a software application associated with the third document and a software application associated with the fourth document.

2. The method of claim 1 further comprising:
   receiving second mapping information at a third time, the second mapping information identifying a correspondence between a fifth variable included at a fifth document and a sixth variable included at a sixth document;

identifying a second data manipulation operation, the operation to generate a value of the sixth variable based on a value of the fifth variable;

storing the second mapping information and the second data manipulation operation at the database;

receiving a request at a third time, the request to identify a correspondence between variables included at a seventh document and variables included at an eighth document;

and determining a correspondence between a seventh variable included at the seventh document and an eighth variable included at the eight document based on the first mapping information, the first data manipulation operation, the second mapping information, and the second data manipulation operation.

3. The method of claim 1 wherein the first data manipulation operation is a string manipulation.

4. The method of claim 1 wherein the first data manipulation operation is a numerical manipulation.

5. The method of claim 1 wherein the first data manipulation operation is specified using a program script.

6. The method of claim 1 further comprising determining a correspondence between the third variable and a fifth variable at the fourth document based on the first data manipulation operation.

7. The method of claim 1 further comprising determining a correspondence between a fifth variable at the third document and the fourth variable at the fourth document based on the first manipulation operation.

8. A method comprising:

receiving a symbolic representation of a first business process at a service provider, the process including transfer of information from a first software application to a second software application, the first business process provided by a first customer of the service provider;

determining, by the service provider using a computer and in response to a request by the first customer, a first association between a first data field included at a first document providing access to information associated with a first software application program and a second data field included at a second document associated with the second software application, and determining a first data manipulation operation to modify data associated with the first data field, the modified data to be associated with the second data field;

and providing, by the service provider, a system integration application program based on the determining, the system integration application program to provide an interface for the transfer of information between the first software application and the second software application, the transfer based on the first association and the first data manipulation operation;

wherein the determining is based on association information and data manipulation operations maintained at a database, the association information and the data manipulation operations determined based on a mapping between a third data field included at a third document associated with a third software application and a fourth data field included at a fourth document associated with a fourth software application, the third and fourth software applications included at a previously received business process representation provided by a second customer of the service provider.

9. The method of claim 8 wherein the first data manipulation operation includes a string manipulation or a numerical operation.

10. The method of claim 8 wherein the first data manipulation operation is specified using a program script.

11. The method of claim 8 wherein the first data field is to provide accessibility to information associated with the first application.

12. The method of claim 8 wherein the association information further identifies a correspondence between the first data field and a third data field included at the second software application.

13. The method of claim 8 wherein the first data manipulation operation is further to modify data associated with the first data field, the modified data to be associated with a third data field included at the second software application.

14. A system comprising:

a memory;

a microprocessor operatively connected to the memory for executing computer-readable code stored in the memory;

and a computer-readable program code stored in the memory and executable by the microprocessor to:

receive a symbolic representation of a first business process at a service provider, the process including transfer of information from a first software application to a second software application, the first business process provided by a first customer of the service provider;

determine, by the service provider in response to a request by the first customer, a first association between a first data field included at a first document providing access to information associated with a first software application program and a second data field included at a second document associated with the second software application, and determine a first data manipulation operation to modify data associated with the first data field, the modified data to be associated with the second data field;

and generate, by the service provider, software code sets to implement transfer of information between the first software application and the second software application, the transfer based on the first association and the first data manipulation operation;

wherein the determining is based on association information and data manipulation operations maintained at a database, the association information and the data manipulation operations determined based on a mapping between a third data field included at a third document associated with a third software application and a fourth data field included at a fourth document associated with a fourth software application, the third and fourth software applications included at a previously received business process representation provided by a second customer of the service provider.

15. The method of claim 14 wherein the first data manipulation operation includes a string manipulation or a numerical operation.

16. The method of claim 14 wherein the first data manipulation operation is specified using a program script.

* * * * *